United States Patent
Fan et al.

(10) Patent No.: US 9,872,099 B2
(45) Date of Patent: Jan. 16, 2018

(54) SHUTTER COVERED ON SOUND HOLE OF LOUDSPEAKER MODULE AND ASSEMBLING METHOD THEREOF, LOUDSPEAKER MODULE

(71) Applicant: GOERTEK INC.

(72) Inventors: Shuangshuang Fan, WeiFang (CN); Gang Chen, WeiFang (CN); Dan Han, WeiFang (CN); Yun Yang, WeiFang (CN); Hongwei Du, WeiFang (CN)

(73) Assignee: GOERTEK INC., Hi-Tech Industry Development District WeiFang Shangdong (CN)

( * ) Notice: Subject to any disclaimer, the term of this patent is extended or adjusted under 35 U.S.C. 154(b) by 0 days.

(21) Appl. No.: 14/890,224

(22) PCT Filed: Dec. 13, 2013

(86) PCT No.: PCT/CN2013/089394
§ 371 (c)(1),
(2) Date: Nov. 10, 2015

(87) PCT Pub. No.: WO2014/180140
PCT Pub. Date: Nov. 13, 2014

(65) Prior Publication Data
US 2016/0088385 A1 Mar. 24, 2016

(30) Foreign Application Priority Data

May 10, 2013 (CN) .......................... 2013 1 0169869
May 10, 2013 (CN) .......................... 2013 1 0169876

(51) Int. Cl.
*H04R 1/02* (2006.01)
*H04R 1/28* (2006.01)
(Continued)

(52) U.S. Cl.
CPC ............ *H04R 1/2803* (2013.01); *B29B 11/04* (2013.01); *B29B 11/08* (2013.01); *B29B 11/14* (2013.01);
(Continued)

(58) Field of Classification Search
CPC ..... H04R 1/023; H04R 2499/11; H04R 31/00
See application file for complete search history.

(56) References Cited

U.S. PATENT DOCUMENTS 4,832,150 A * 5/1989 Just .................. B29C 45/14336
181/150
5,828,012 A * 10/1998 Repolle .................. H04R 1/023
181/175
(Continued)

FOREIGN PATENT DOCUMENTS

CN 2857383 1/2007
CN 101360352 2/2009
(Continued)

OTHER PUBLICATIONS

First Office Action for KR 10-2015-7035070 dated Feb. 20, 2017.
(Continued)

*Primary Examiner* — Curtis Kuntz
*Assistant Examiner* — Ryan Robinson
(74) *Attorney, Agent, or Firm* — Muir Patent Law, PLLC

(57) ABSTRACT

A blocking piece covering the sound hole of a loudspeaker module may be arranged at a position where the sound hole is located on the case of the loudspeaker module and covers the sound hole. The blocking piece may be made of a nonmetallic flexible net. The nonmetallic net-shaped blocking piece and the case may be formed integrally by injection molding. The loudspeaker module and the blocking piece covering the sound hole thereof in the present invention may provide good acoustic performance, high reliability, high (Continued)

space utilization rate and/or high production efficiency. The assembling method for the blocking piece covering the sound hole of the loudspeaker module further makes the assembling of the blocking piece convenient for operation, and improves the assembling efficiency and assembling quality.

8 Claims, 7 Drawing Sheets

(51) Int. Cl.
*B29B 11/04* (2006.01)
*B29B 11/08* (2006.01)
*B29B 11/14* (2006.01)
*B29C 45/14* (2006.01)
*B29C 45/16* (2006.01)
*B29K 101/00* (2006.01)
*B29K 105/00* (2006.01)
*B29L 31/34* (2006.01)

(52) U.S. Cl.
CPC ........ *B29C 45/14* (2013.01); *B29C 45/14008* (2013.01); *B29C 45/1671* (2013.01); *H04R 1/02* (2013.01); *H04R 1/023* (2013.01); *B29K 2101/00* (2013.01); *B29K 2105/256* (2013.01); *B29L 2031/3437* (2013.01); *B29L 2031/3481* (2013.01); *H04R 2499/11* (2013.01)

(56) References Cited

U.S. PATENT DOCUMENTS

| | | | | |
|---|---|---|---|---|
| 5,939,682 A * | 8/1999 | Hartmann | ............. | H04R 1/023 181/141 |
| 6,907,121 B1 * | 6/2005 | Andersson | ............. | H04R 1/30 379/433.02 |
| 6,932,187 B2 * | 8/2005 | Banter | ............. | H04R 1/086 181/149 |
| 8,631,558 B2 * | 1/2014 | Liang | ............. | H04R 1/00 29/592 |
| 9,492,958 B2 * | 11/2016 | Chao | ............. | B29C 45/14008 |
| 2012/0148534 A1 | 6/2012 | Glenn et al. | | |
| 2013/0032285 A1 * | 2/2013 | Mietta | ............. | B32B 3/266 156/250 |
| 2014/0060330 A1 * | 3/2014 | Boyat | ............. | H05K 5/0213 96/11 |
| 2014/0193023 A1 * | 7/2014 | Heo | ............. | H01Q 1/2283 381/391 |
| 2015/0036845 A1 * | 2/2015 | Lu | ............. | H04R 1/02 381/189 |
| 2016/0073183 A1 * | 3/2016 | Auclair | ............. | H04R 1/023 181/151 |

FOREIGN PATENT DOCUMENTS

| | | |
|---|---|---|
| CN | 102547497 | 7/2012 |
| CN | 202334881 | 7/2012 |
| CN | 202679595 | 1/2013 |
| CN | 103269462 | 8/2013 |
| CN | 103281665 | 9/2013 |
| CN | 103297904 | 9/2013 |
| CN | 203301682 | 11/2013 |

OTHER PUBLICATIONS

Office Action from Chinese Patent Office for CN 201310169869.4 dated Aug. 5, 2014.
Office Action from Chinese Patent Office for CN 201310169869.4 dated May 11, 2015.
Office Action from Chinese Patent Office for CN 201310169869.4 dated Feb. 2, 2015.
Office Action from Chinese Patent Office for CN 201310169869.4 dated Aug. 21, 2015.
Office Action from Chinese Patent Office for CN 201310169876.4 dated Jun. 1, 2015.

* cited by examiner

SHUTTER COVERED ON SOUND HOLE OF LOUDSPEAKER MODULE AND ASSEMBLING METHOD THEREOF, LOUDSPEAKER MODULE

FIELD OF THE INVENTION

The present invention relates to the field of electro-acoustic technology, and more specifically, to a blocking piece covering the sound hole of a loudspeaker module and an assembling method thereof, a loudspeaker module.

BACKGROUND

With the growth of the consumer electronics market, a large quantity of consumer electronics products including cell phones, laptops are widely used, and correspondingly, loudspeaker modules serving as an important acoustic part in the consumer electronics products are widely demanded. When the requirements on the consumer electronics products are getting higher and higher, the performances of the loudspeaker modules are attracting more and more attentions.

Usually, a loudspeaker module comprises a case and a loudspeaker unit accommodated and fixed in the case, wherein a sound hole is disposed on the case and near to the loudspeaker unit, so that sound waves emitted by the loudspeaker unit may propagate to the outside of the loudspeaker module through the sound hole. A net is commonly attached to the sound hole so as to improve the waterproof and dustproof performance of the loudspeaker module and in the meantime to adjust the acoustic performance of the same. The net is usually made of metal materials for convenient assembling thereof. A metal net exhibits higher hardness and is easy to locate and fix when assembled, however, it is made relatively thick and has relatively large meshes with a diameter of 0.1 mm and above due to its material and processing limitations, which results in poor waterproof and dustproof effects and easy corrosion, and thus brings negative influence on the performances of the loudspeaker module. In addition, a metal net may increase the metal using area in the loudspeaker module, which may affect some parts of the terminal products.

The net may also be a nonmetallic flexible net, such as a flexible net made of a nylon material, which may have a thin thickness and small meshes, and often be manually attached to the surface of the case of a loudspeaker module. However, a flexible net is soft and thus not easy to manipulate when attached, which may cause a low assembling efficiency and easily occurring unqualified products. Furthermore, a flexible net is easy to have a rough selvedge, which may affect the appearance of the products.

A damping cloth or a metal net is often manually or automatically attached to the sound hole of a loudspeaker module during its assembling process. The manual attachment method is poor in positioning the damping cloth and has a low assembling efficiency, while the automatic attachment method has a high cost of production. In addition, the damping cloth attached to the sound hole of a loudspeaker module may affect the appearance of the module and increase the volume of the same. Therefore, it is necessary to provide a modification to overcome the defects of the prior loudspeaker module, the net covering the sound hole of the same and the assembling method thereof.

SUMMARY

In order to solve the above problems, the present invention provides a blocking piece covering the sound hole of a loudspeaker module and an assembling method thereof, a loudspeaker module. On the one hand, a nonmetallic flexible net with thin thickness and small mesh diameter is utilized in the assembling method, which has advantages of good waterproof and dustproof performance and acoustic performance, high reliability, high space utilization rate, small metal using area, and high production efficiency, on the other hand, the assembling of the nonmetallic flexible net is convenient to operate, and the assembling efficiency and assembling quality are improved.

In one aspect of the present invention, there is provided a blocking piece covering the sound hole of a loudspeaker module, wherein the blocking piece is disposed at a position where the sound hole is located on the case of the loudspeaker module and is covered on the sound hole, the blocking piece is a nonmetallic flexible net, and is integrally formed on the case by injection moulding.

Preferably, the thickness of the blocking piece may be in the range of 0.05 mm to 0.3 mm, and the diameter of the meshes of the blocking piece may be in the range of 0.03 mm to 0.1 mm. Further preferably, the thickness of the blocking piece may be in the range of 0.05 mm to 0.1 mm, and the diameter of the meshes of the blocking piece may be in the range of 0.03 mm to 0.05 mm.

Preferably, the case may be made of a nonmetallic material. The blocking piece may be made of a nylon mesh cloth.

In another aspect of the present invention, there is provided a loudspeaker module, comprising a case and a loudspeaker unit accommodated and fixed in the case, wherein a sound hole is disposed for emission of sound on the case and near to the loudspeaker unit, characterized in that the loudspeaker module further comprises a blocking piece as mentioned above.

Preferably, a sound-guiding cavity connecting the loudspeaker unit with the sound hole may be disposed in the case. Further preferably, the sound hole may be disposed on the sidewall of the case. The sound-guiding cavity may have a horn shape broadening from the inside out.

The blocking piece made of a nonmetallic net according to the present invention is disposed at a position where the sound hole is located and integrally formed by injection moulding on the case of a loudspeaker module, which is advantageous in effectively adjusting the acoustic performance of the loudspeaker module without affecting the volume thereof, and improving the utilization rate of the inner space of the loudspeaker module. The blocking piece and the case are integrally formed by injection moulding so that the blocking piece and the case are securely combined to prevent the blocking piece from falling off and improve the reliability of the loudspeaker module. The nonmetallic blocking piece and the nonmetallic case are integrally formed by injection moulding so that the metal using area in the loudspeaker module can be reduced, and in the mean time, no other parts need to be attached during the production process, and thus the production efficiency can be increased. In a word, the blocking piece covering the sound hole of a loudspeaker module according to the present invention allows the module to have advantages of good acoustic performance, high reliability, high space utilization rate, and high production efficiency.

The present invention further provides an assembling method of a blocking piece covering the sound hole of a loudspeaker module, the assembling method comprises the following steps of:
(1) forming a substrate, wherein a plurality of hollow holes are arranged on the substrate;

(2) preparing a nonmetallic flexible mesh ribbon, attaching the flexible mesh ribbon to the substrate and having all the hollow holes covered with the flexible mesh ribbon;

(3) putting the substrate attached with the flexible mesh ribbon in a first injection moulding mold, and forming by injection moulding a plurality of annular first injection moulding bodies on the flexible mesh ribbon portions covering the plurality of hollow holes, wherein the annular first injection moulding bodies are integrated with the flexible mesh ribbon portions;

(4) obtaining a plurality of separate first injection moulding parts by cutting the flexible mesh ribbon from the peripheries of the first injection moulding bodies, wherein each first injection moulding part comprises a first injection moulding body and a blocking piece, the blocking piece is integrated with the first injection moulding body and cut from the flexible mesh ribbon;

(5) putting the first injection moulding part in a second injection moulding mold, and forming in a second injection moulding process the case of a loudspeaker module integrated with the first injection moulding part, wherein the inner hole of the first injection moulding body forms the sound hole of the loudspeaker module.

Preferably, between the step (2) and step (3), location holes may be opened on the substrate and on the both sides of the flexible mesh ribbon, and the substrate attached with the flexible mesh ribbon may be fixed in the first injection moulding mold through the location holes.

Preferably, between step (2) and step (3), holes may be formed on both sides of each of the flexible mesh ribbon portions covering the hollow holes so that a flexible mesh ribbon beam is formed between two holes, and the first injection moulding bodies are formed on the flexible mesh ribbon beams, wherein the flexible mesh ribbon beams are greater in length than the first injection moulding bodies, and fully cover the inner holes of the first injection moulding bodies in the width direction thereof.

Preferably, the width of the flexible mesh ribbon beams may be slightly smaller than the width between two outer edges of each first injection moulding body in the width direction thereof, so that the two edges of each flexible mesh ribbon beam may be embedded in the corresponding first injection moulding body during the injection moulding process thereof.

Preferably, in the step (5), the first injection moulding part may form a portion of the walls of the case of the loudspeaker module in the second injection moulding process, and thus the blocking piece embedded in the first injection moulding part may be embedded on the case of the loudspeaker module or in the inner surface of the case of the same.

Preferably, the thickness of the flexible mesh ribbon may be in the range of 0.05 mm to 0.3 mm, and the diameter of the meshes of the flexible mesh ribbon may be in the range of 0.03 mm to 0.1 mm. Further preferably, the thickness of the flexible mesh ribbon may be in the range of 0.05 mm to 0.1 mm, and the diameter of the meshes of the flexible mesh ribbon may be in the range of 0.03 mm to 0.05 mm.

In the assembling method according to the present invention, the substrate has a long strip shape, a plurality of hollow holes are arranged on the substrate, one first injection moulding part is formed at each single hollow hole in the subsequent steps, and thus a plurality of first injection moulding parts may be formed in one run, which improves the production efficiency. Annular first injection bodies are formed on the flexible mesh ribbon portions covering the hollow holes through a first injection moulding process, wherein the annular first injection moulding bodies are integrated with the flexible mesh ribbon portions, then separate first injection moulding parts can be obtained by cutting the flexible mesh ribbon from the peripheries of the first injection moulding bodies. Therefore, the peripheries of the blocking pieces made of a flexible net are fixed by the first injection moulding bodies, which solves the problem that a flexible net is soft and easy to deform, and thus is not easy to be assembled. Subsequently, the case of the loudspeaker module is formed and the first injection moulding part is integrated with the case by the second injection moulding process, wherein the inner hole of the first injection moulding body serves as the sound hole of the loudspeaker module. At this point, the assembling of the flexible net is done. The assembling method according to the present invention makes the assembling operation of the blocking piece simple and easy to perform, and thus improves the assembling efficiency. In addition, the assembling of the flexible net is achieved by injection moulding, the blocking piece and the case can be securely combined to prevent the blocking piece from falling off due to unfirm sticking thereof in the prior art.

Furthermore, holes may be formed on both sides of each of the flexible mesh ribbon portions covering the hollow holes before the first injection moulding process. The operation of cutting the planar flexible mesh ribbon to form holes is easier to perform than the operation of cutting the flexible mesh ribbon from both sides of each of the molded first injection moulding bodies. After the first injection moulding bodies are formed by injection moulding on the flexible mesh ribbon beams formed between the holes, the flexile mesh ribbon needs only to be cut from other two narrower sides of each of the first injection moulding parts, which makes the cutting of the flexible mesh ribbon less difficult and thus improves the cutting efficiency.

Furthermore, the width of the flexible mesh ribbon beams is slightly smaller than the width between two outer edges of each of the first injection moulding bodies in the width direction thereof, so that the two edges of each of the flexible mesh ribbon beams may be embedded in the corresponding first injection moulding body during the injection moulding process thereof. Thus, the two sides of each of the first injection moulding parts will not have a rough selvedge, so that the appearance of the products looks decent, meanwhile, the blocking pieces can be securely integrated with the first injection bodies.

In addition, in the assembling method according to the present invention, the blocking pieces are made of a nonmetallic flexible net, for example, a nylon mesh ribbon, therefore, the blocking pieces can be made thinner with a thickness of 0.05 mm or so, which can reduce space utilization and thus will not increase the volume of the products; the diameter of the meshes of the flexible mesh ribbon may be very small, for example, in the range of 0.03 mm to 0.05 mm, which can improve the waterproof and dustproof performance of the loudspeaker module. Furthermore, the blocking pieces will not get rusty, which can improve the lifetime and the reliability of the loudspeaker module.

BRIEF DESCRIPTION OF THE DRAWINGS

The present invention will be further described in conjunction with the accompanying drawings and embodiments.

DETAILED DESCRIPTION

Figure 1:
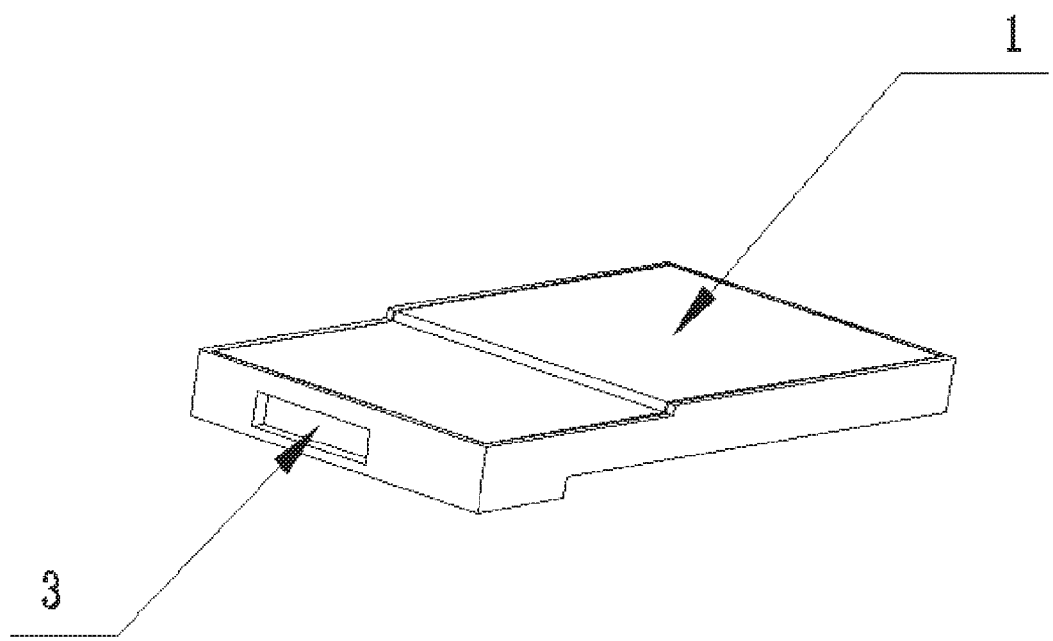
FIG. 1 is a perspective view showing a loudspeaker module according to one embodiment of the present invention.

The specific structures of the loudspeaker module and the blocking piece covering the sound hole thereof and the assembling method of the blocking piece according to the present invention will be described in details in conjunction with the drawings.

As shown in FIG. 1 to FIG. 4, the loudspeaker module according to the present invention comprises a case 1, a loudspeaker unit 2 and electrical connecting means (not shown in the drawings) accommodated and fixed in the case 1, wherein the electrical connecting means send external electrical signals to the loudspeaker unit 2, and make the loudspeaker unit 2 produce sound, a sound hole 3 is disposed on the case 1 and near to the loudspeaker unit 2, the sound produced by the loudspeaker unit 2 propagates to the outside of the loudspeaker module through the sound hole 3.

Figure 3:
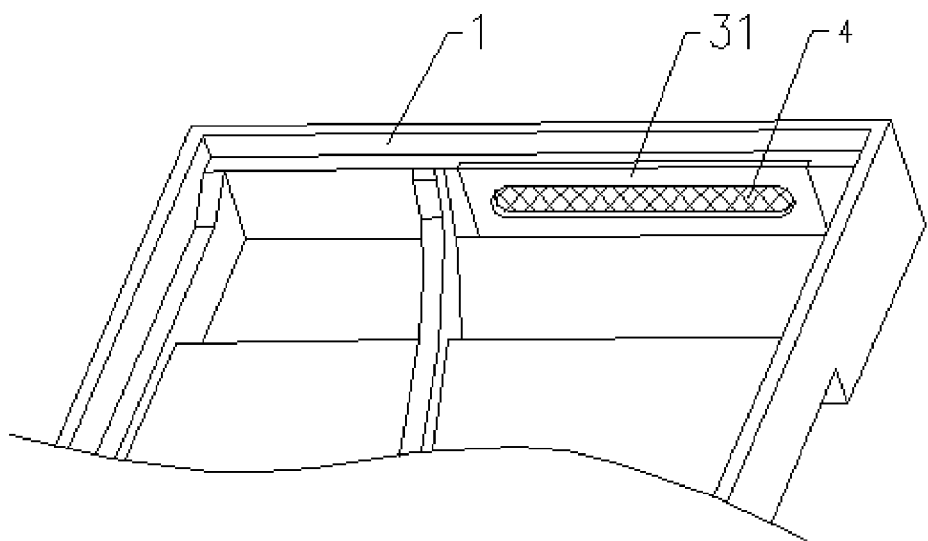
FIG. 3 is perspective view showing details of the inner structure of the loudspeaker module shown in FIG. 1.
Figure 4:
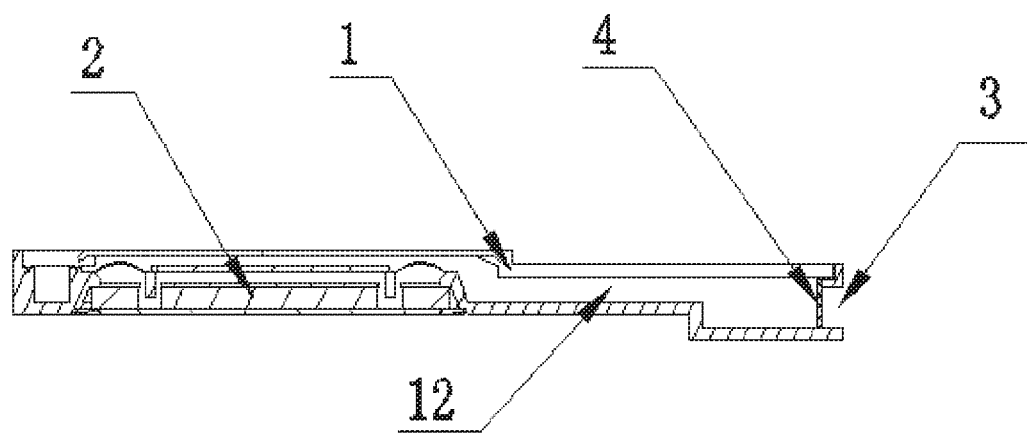
FIG. 4 is a cross-sectional view showing the loudspeaker module of FIG. 1.
Figure 5:
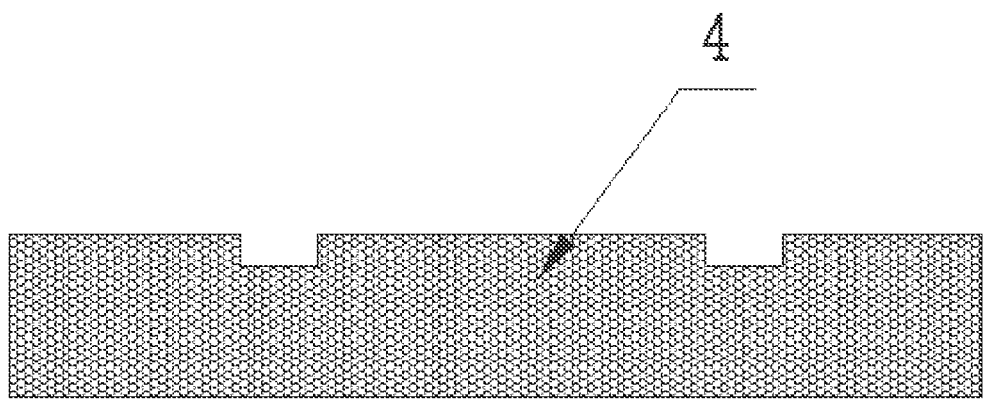
FIG. 5 is a schematic view showing a blocking piece in the loudspeaker module according to the present invention.

As shown in FIG. 3 to FIG. 5, in the loudspeaker module according to the present invention, a blocking piece 4 is disposed at a position where the sound hole 3 is located on the case 1, the sound hole 3 is covered by the blocking piece 4; the blocking piece 4 is made of a nonmetallic flexible net, and is integrated with the case 1 by injection moulding. The blocking piece 4 made of a nonmetallic flexible net can allow an effective adjustment of the acoustic performance of the loudspeaker module, prevent foreign matter from entering the inside of the loudspeaker module and thus improve the waterproof and dustproof performance of the loudspeaker module. The blocking piece 4 and the case 1 are integrally formed, which makes the blocking piece 4 and the case 1 securely binded, and prevents the blocking piece 4 from falling off, and thus improves the reliability of the loudspeaker module. In addition, during the assembling process of the loudspeaker module, no other parts need to be attached to the sound hole 3, which may improve production efficiency. As shown in FIG. 3, the blocking piece 4 is disposed near to the sound hole 3 in the loudspeaker module, which may improve the space utilization rate of the loudspeaker module. Preferably, the blocking piece 4 made of a nonmetallic net in the loudspeaker module according to the present invention as shown in the drawings has a thin structure, the thickness thereof is preferably 0.05 mm to 0.3 mm, and more preferably, 0.05 mm to 0.1 mm, which may reduce the utilization of the inner space of the loudspeaker module, and have less affect on the acoustic performance of the loudspeaker module. As shown in FIG. 3 and FIG. 5, the blocking piece 4 made of a nonmetallic net in the loudspeaker module according to the present invention has a structure with dense meshes, and the diameter of the meshes is preferably 0.03 mm to 0.1 mm, and more preferably, 0.03 mm to 0.05 mm, which may improve the waterproof and dustproof performance of the loudspeaker module. Preferably, the nonmetallic net made blocking piece may be made of a nylon mesh cloth, which may lower the production cost of the loudspeaker module according to the present invention, and realize a good waterproof and dustproof effect.

In order to reduce electromagnetic interference on other parts of the electronic product caused by the metal material used in the loudspeaker module, the case of the loudspeaker module according to the present invention is preferably made of a nonmetallic material, and the nonmetallic case and the nonmetallic blocking piece are integrally formed by injection moulding. The nonmetallic case and the nonmetallic blocking piece can be securely combined, which may prevent the blocking piece from falling off and thus improve the reliability of the loudspeaker module.

As an embodiment of the loudspeaker module according to the present invention, the loudspeaker module shown in FIG. 4 comprises a sound-guiding cavity 12 disposed in the case 1 and connecting the loudspeaker unit 2 with the sound hole 3, wherein the sound hole 3 is disposed on the sidewall of the case 1 and the loudspeaker module according to the embodiment lets out sound from the side thereof. It should be understood that the structure and the configuration of the sound hole and the loudspeaker unit in the loudspeaker module shown in the drawings are only exemplified embodiments of the present invention, which are used to illustrate the structure of the loudspeaker module and should not be interpreted as restrictions on the loudspeaker module according to the present invention.

Figure 2:
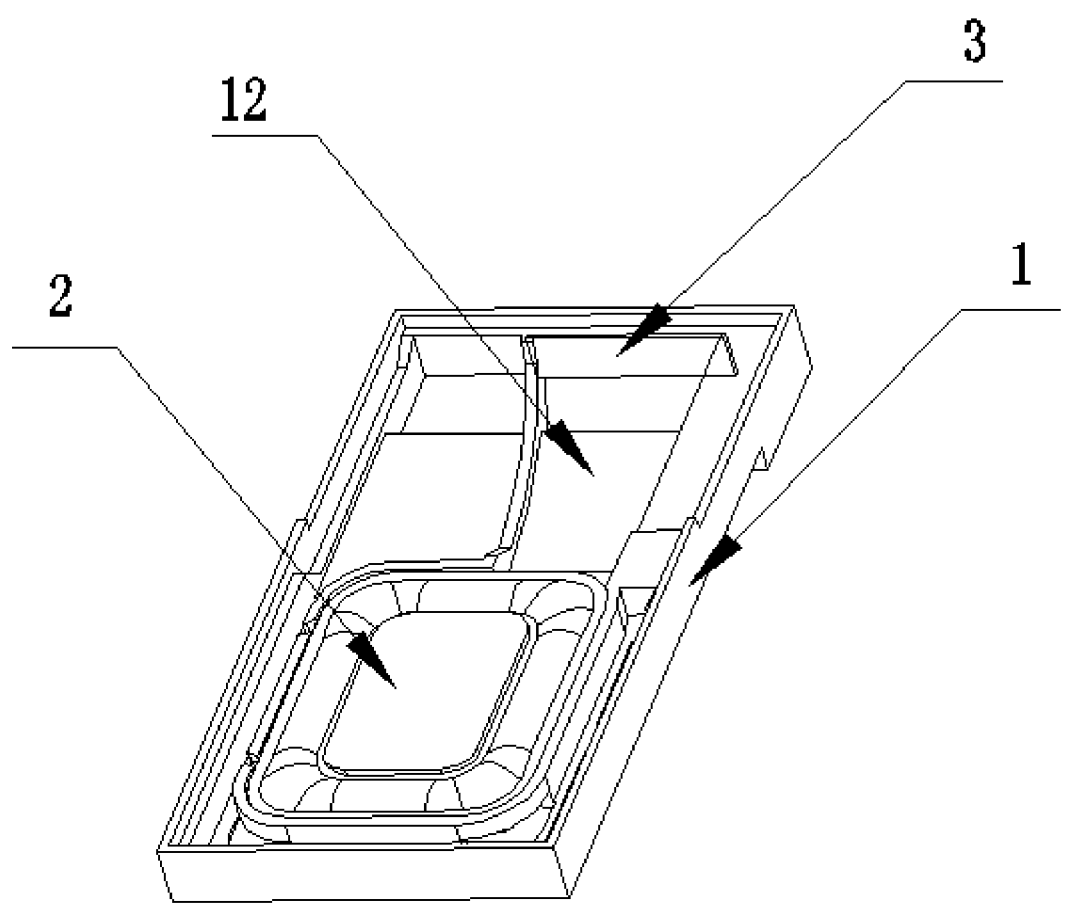
FIG. 2 is a perspective view showing the inner structure of the loudspeaker module shown in FIG. 1.

As shown in FIG. 2, the sound-guiding cavity 12 in the case 1 of the loudspeaker module according to the present invention preferably has a horn shape broadening from the inside out, which may improve the sound effect of the loudspeaker module and thus improve the acoustic performance of the same.

In the loudspeaker module according to the present invention, the blocking piece is made of a nonmetallic flexible net, which has the advantages over a blocking piece made of a metallic net in that the nonmetallic structured blocking piece produces less negative effects on the acoustic performance of the loudspeaker module due to its thin thickness and less utilization of the inner space of the loudspeaker module; the nonmetallic structured blocking piece may have more and smaller meshes and thus have a better waterproof and dustproof performance; the nonmetallic structured blocking piece can be securely integrated with a nonmetallic case, which will improve the reliability of the loudspeaker module; the nonmetallic structured blocking piece will not get rusty, which will improve the lifetime and the liability of the loudspeaker module.

Instead of a nylon mesh cloth attached to the sound hole in the prior loudspeaker module, a blocking piece made of a nonmetallic net is disposed on the sound hole and integrated with the case by injection moulding in the loudspeaker module according to the present invention, and no other parts need to be attached during the production process, which may improve the production efficiency; the blocking piece and the case are integrally formed and the combination thereof is firm, which may prevent the blocking piece from falling off and thus improve the reliability of the loudspeaker module; the blocking piece made of a nonmetallic net and disposed on the sound hole may allow an effective adjustment of the acoustic performance of the loudspeaker module, produce less negative effects on the volume of the same and thus improve the space utilization rate of the same. In a word, the loudspeaker module according to the present invention has advantages of good acoustic performance, high reliability, high space utilization rate, and high production efficiency.

Figure 7:
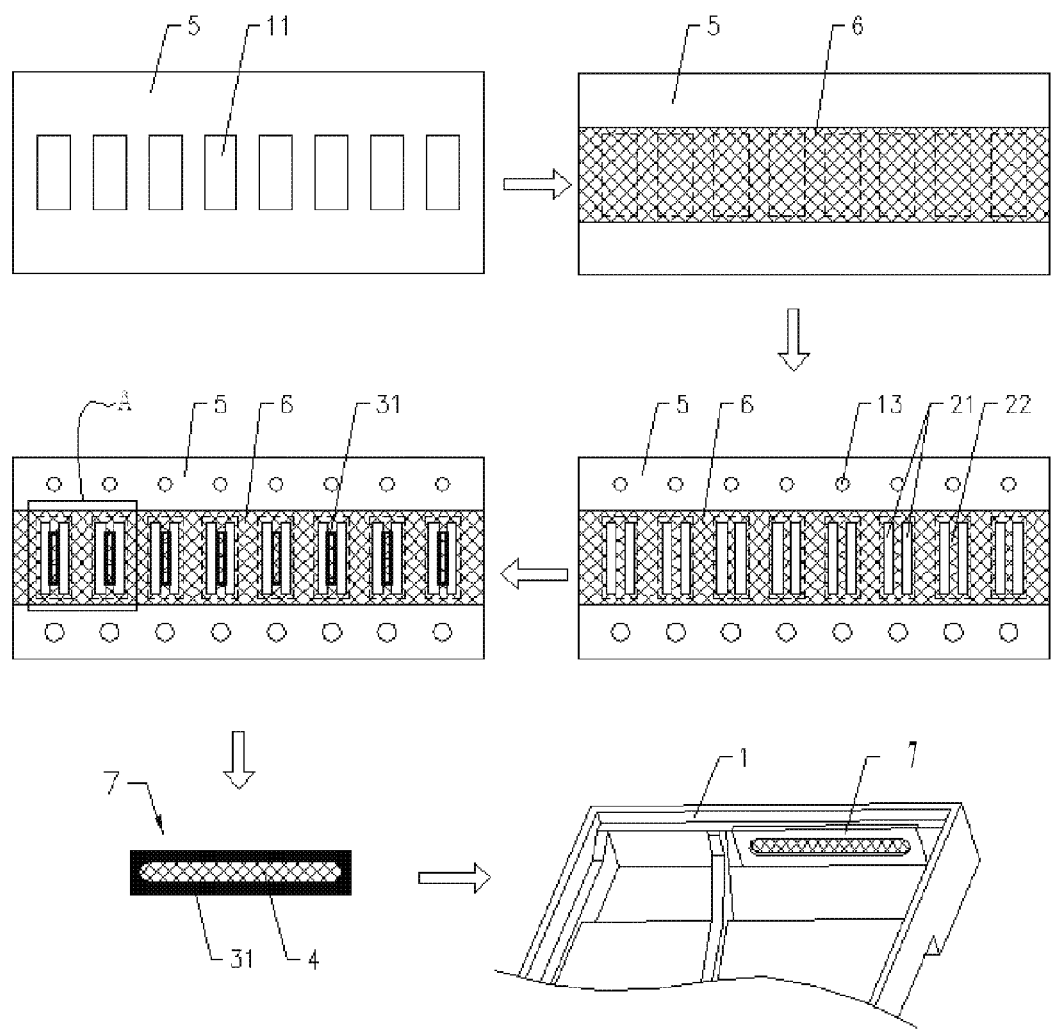
FIG. 7 is an assembly view showing the assembling method of the blocking piece covering the sound hole of a loudspeaker module according to the second embodiment of the present invention.
Figure 8:
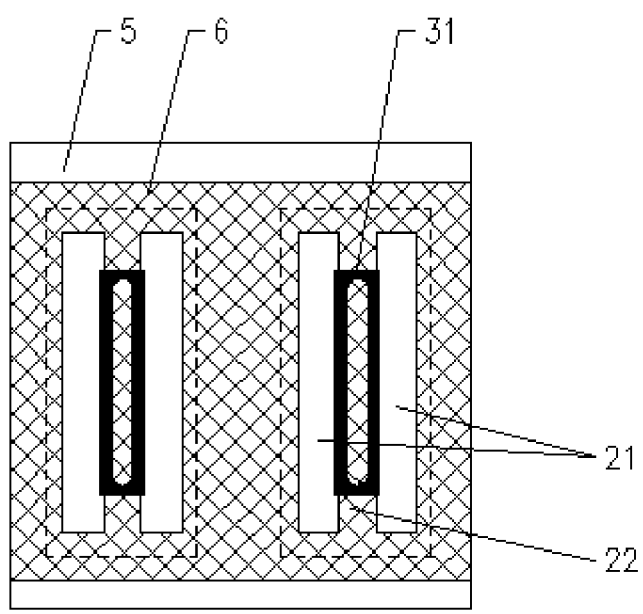
FIG. 8 is an enlarged view showing the A portion of FIG. 7.

The present invention further provides an assembling method of the blocking piece covering the sound hole of a loudspeaker module, which will be described hereinafter in conjunction with FIG. 6-FIG. 8.

The First Embodiment

Figure 6:
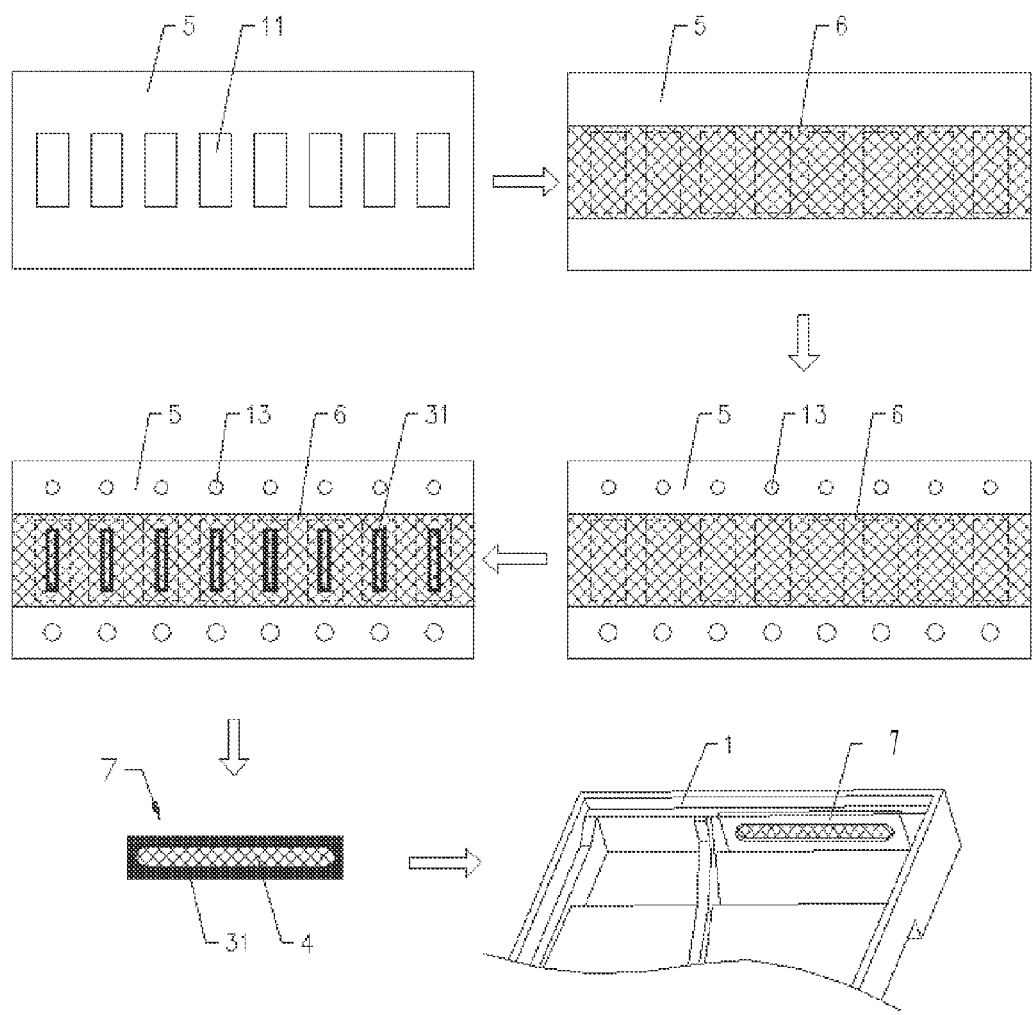
FIG. 6 is an assembly view showing the assembling method of the blocking piece covering the sound hole of a loudspeaker module according to the first embodiment of the present invention.

FIG. 6 shows an assembling method of the blocking piece covering the sound hole of a loudspeaker module, wherein the blocking piece used in the embodiment is made of a nylon net for sake of saving costs. The blocking piece may also be made of other well known plastic nets. The thickness of the blocking piece may be in the range of 0.05 mm to 0.3 mm, and the diameter of the meshes of the blocking piece may be in the range of 0.03 mm to 0.1 mm. More preferably, the thickness of the blocking piece may be in the range of 0.05 mm to 0.1 mm, for example, 0.05 mm, and the diameter of the meshes of the blocking piece may be in the range of 0.03 mm to 0.05 mm. Compared with a metallic blocking piece, the nonmetallic blocking piece may be thinner and use less space without increasing the volume of the final product, also, the diameter of the meshes of the blocking piece may be made very small, which will improve the waterproof and dustproof performance of the loudspeaker module. The nonmetallic blocking piece will not get rusty, thus allow the improvement on the lifetime and the reliability of the loudspeaker module.

The assembling method according to the first embodiment specifically comprises the following steps.

(1) A substrate 5 is formed. The substrate 5 may be made of a PET material for sake of saving costs, the substrate 5 may also be made of other nonmetallic or metallic materials. The substrate 5 is made into a long strip shape, and a plurality of hollow holes 11 are arranged on the substrate 5. One first injection moulding part 7 is formed at each single hollow hole 11 in the subsequent steps, and thus a plurality of first injection moulding parts 7 may be formed in one run according to the assembling method of the present invention and the production efficiency may thus be improved.

(2) A nonmetallic flexible mesh ribbon 6 is prepared, and the flexible mesh ribbon 6 is attached to the substrate 5 and covers all the hollow holes 11. In order to locate the substrate 5 in the subsequent step, location holes 13 may be opened on the substrate 5 and on the both sides of the flexible mesh ribbon 6.

(3) the substrate 5 attached with the flexible mesh ribbon 6 is put in a first injection moulding mold, and fixed through the location holes 13, then, a plurality of annular first injection moulding bodies 31 are formed by injection moulding on the flexible mesh ribbon portions covering the plurality of hollow holes 11, wherein the annular first injection moulding bodies 31 are integrated with the flexible mesh ribbon portions, and the size of the inner holes of the first injection moulding bodies 31 is equal to or greater than the predetermined size of the sound hole.

(4) A plurality of separate first injection moulding parts 7 are obtained by cutting the flexible mesh ribbon 6 from the peripheries of the first injection moulding bodies 31, wherein each first injection moulding part 7 comprises a first injection moulding body 31 and a blocking piece 4, the blocking piece 4 is integrated with the first injection moulding body 31 and cut from the flexible mesh ribbon 6. The peripheries of the blocking pieces 4 are fixed by the first injection moulding bodies 31, which solves the problem that the blocking pieces 4 are soft and easy to deform, and thus are not easy to be assembled.

(5) The first injection moulding part 7 is put in a second injection moulding mold, and the case 1 of a loudspeaker module integrated with the first injection moulding part 7 is formed in a second injection moulding process, wherein the inner hole of the first injection moulding body 31 forms the sound hole of the loudspeaker module. At this point, the assembling of the blocking piece 4 is done. In the first embodiment, the first injection moulding part 7 forms a portion of the internal wall of the case 1 of the loudspeaker module, the blocking piece 4 embedded in the first injection moulding part 7 is embedded on the case 1 of the loudspeaker module or in the inner surface of the case 1 of the same. The present invention is not limited thereto. The first injection moulding part 7 may form a portion of the external wall of the case 1 of the loudspeaker module, the blocking piece 4 embedded in the first injection moulding part 7 may be embedded on the case 1 of the loudspeaker module or in the outer surface of the case 1 of the same.

The assembling method according to the present invention makes the assembling operation of the blocking piece 4 simple and easy to perform, and thus improves the assembling efficiency. In addition, the assembling of the blocking piece 4 is achieved by injection moulding, the blocking piece and the case can be securely combined to prevent the blocking piece 4 from falling off due to unfirm sticking thereof in the prior art.

The Second Embodiment

The second embodiment is different from the first embodiment in that holes 21 are formed on both sides of each of the flexible mesh ribbon portions covering the hollow holes 11 between step (2) and step (3), so that a flexible mesh ribbon beam 22 is formed between two holes 21. In the step (3), the first injection moulding bodies 31 are formed on the flexible mesh ribbon beams 22, wherein the flexible mesh ribbon beams 22 are greater in length than the first injection moulding bodies 31, and fully cover the inner holes of the first injection moulding bodies 31 in the width direction thereof. The operation of cutting the planar flexible mesh ribbon 6 covering the hollow holes 11 to form holes 21 before the first injection moulding process is easier to perform than the operation of cutting the flexible mesh ribbon from both sides of each of the molded first injection moulding bodies 31 after the formation of the first injection moulding bodies 31. After the first injection moulding bodies 31 are formed by injection moulding on the flexible mesh ribbon beams 22, the flexile mesh ribbon 6 needs only to be cut from other two narrower sides of each of the first injection moulding bodies 31, which makes the cutting of the flexible mesh ribbon less difficult and thus improves the cutting efficiency.

Preferably, the width of the flexible mesh ribbon beams 22 may be slightly smaller than the width between two outer edges of each first injection moulding body 31 in the width direction thereof, so that the two edges of each flexible mesh ribbon beam 22 may be embedded in the corresponding first injection moulding body 31 during the injection moulding process thereof. According to the embodiment, the two sides of each of the first injection moulding parts 7 will not have a rough selvedge, so that the appearance of the products looks decent, meanwhile, the blocking pieces can be securely integrated with the first injection bodies.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to examples described herein but is to be accorded the widest scope consistent with the principles and novel features disclosed herein.

The invention claimed is:

1. An assembling method of a blocking piece covering the sound hole of a loudspeaker module, wherein the assembling method comprises the following steps of:
    (1) forming a substrate, wherein a plurality of hollow holes are arranged on the substrate;
    (2) preparing a nonmetallic flexible mesh ribbon, attaching the flexible mesh ribbon to the substrate and having all the hollow holes covered with the flexible mesh ribbon;
    (3) putting the substrate attached with the flexible mesh ribbon in a first injection moulding mold, and forming by injection moulding a plurality of annular first injection moulding bodies on the flexible mesh ribbon portions covering the plurality of hollow holes, wherein the annular first injection moulding bodies are integrated with the flexible mesh ribbon portions;
    (4) obtaining a plurality of separate first injection moulding parts by cutting the flexible mesh ribbon from the peripheries of the first injection moulding bodies, wherein each first injection moulding part comprises a first injection moulding body and a blocking piece, the blocking piece is integrated with the first injection moulding body and cut from the flexible mesh ribbon;
    (5) putting the first injection moulding part in a second injection moulding mold, and forming in a second injection moulding process the case of a loudspeaker module integrated with the first injection moulding part, wherein the inner hole of the first injection moulding body forms the sound hole of the loudspeaker module.

2. The assembling method of a blocking piece covering the sound hole of a loudspeaker module according to claim 1, wherein between the step (2) and step (3), location holes are opened on the substrate and on both sides of the flexible mesh ribbon, and the substrate attached with the flexible mesh ribbon is fixed in the first injection moulding mold through the location holes.

3. The assembling method of a blocking piece covering the sound hole of a loudspeaker module according to claim 1, wherein between step (2) and step (3), holes are formed on both sides of each of the flexible mesh ribbon portions covering the hollow holes so that a flexible mesh ribbon beam is formed between two holes, and the first injection moulding bodies are formed on the flexible mesh ribbon beams, wherein the flexible mesh ribbon beams are greater in length than the first injection moulding bodies, and fully cover the inner holes of the first injection moulding bodies in the width direction thereof.

4. The assembling method of a blocking piece covering the sound hole of a loudspeaker module according to claim 3, wherein the width of the flexible mesh ribbon beams is slightly smaller than the width between two outer edges of each first injection moulding body in the width direction thereof, so that the two edges of each flexible mesh ribbon beam are embedded in the corresponding first injection moulding body during the injection moulding process thereof.

5. The assembling method of a blocking piece covering the sound hole of a loudspeaker module according to claim 1, wherein in the step (5), the first injection moulding part forms a portion of the walls of the case of the loudspeaker module in the second injection moulding process, and thus the blocking piece embedded in the first injection moulding part is embedded on the case of the loudspeaker module or in the inner surface of the case of the same.

6. The assembling method of a blocking piece covering the sound hole of a loudspeaker module according to claim 1, wherein the substrate is a PET substrate, and the flexible mesh ribbon is a nylon mesh ribbon.

7. The assembling method of a blocking piece covering the sound hole of a loudspeaker module according to claim 1, wherein the thickness of the flexible mesh ribbon is in the range of 0.05 mm to 0.3 mm, and the diameter of the meshes of the flexible mesh ribbon is in the range of 0.03 mm to 0.1 mm.

8. The assembling method of a blocking piece covering the sound hole of a loudspeaker module according to claim 7, wherein the thickness of the flexible mesh ribbon is in the range of 0.05 mm to 0.1 mm, and the diameter of the meshes of the flexible mesh ribbon is in the range of 0.03 mm to 0.05 mm.

* * * * *